United States Patent
Peng et al.

(10) Patent No.: US 8,907,514 B2
(45) Date of Patent: Dec. 9, 2014

(54) WAVE-DRIVEN POWER GENERATION SYSTEM

(71) Applicants: Sheng-Po Peng, Miaoli County (TW); Sheng-Da Peng, Miaoli County (TW); Kevin Peng, Miaoli County (TW)

(72) Inventors: Sheng-Po Peng, Miaoli County (TW); Sheng-Da Peng, Miaoli County (TW); Kevin Peng, Miaoli County (TW)

( * ) Notice: Subject to any disclaimer, the term of this patent is extended or adjusted under 35 U.S.C. 154(b) by 0 days.

(21) Appl. No.: 14/258,284

(22) Filed: Apr. 22, 2014

(65) Prior Publication Data

US 2014/0239642 A1  Aug. 28, 2014

Related U.S. Application Data

(63) Continuation-in-part of application No. 13/760,162, filed on Feb. 6, 2013, now Pat. No. 8,786,121.

(51) Int. Cl.
*F03B 13/22* (2006.01)
*F03B 13/18* (2006.01)
*F03B 17/00* (2006.01)

(52) U.S. Cl.
CPC ............ *F03B 13/1815* (2013.01); *F03B 17/005* (2013.01); *Y10S 415/916* (2013.01)
USPC .................................. 290/53; 4/491; 415/916

(58) Field of Classification Search
CPC ..... E04H 4/0006; F04D 35/00; A63B 69/125; Y02E 10/38
USPC ................................................ 290/53; 4/491
See application file for complete search history.

(56) References Cited

U.S. PATENT DOCUMENTS

| | | | | |
|---|---|---|---|---|
| 3,287,967 A * | 11/1966 | Laurent | 73/148 |
| 4,580,400 A * | 4/1986 | Watabe et al. | 60/398 |
| 4,705,428 A * | 11/1987 | Andersen | 405/79 |
| 4,730,355 A * | 3/1988 | Kreinbihl et al. | 4/491 |
| 4,783,860 A * | 11/1988 | Funke et al. | 4/491 |
| 5,320,449 A * | 6/1994 | Demarteau | 405/79 |
| 6,019,547 A * | 2/2000 | Hill | 405/79 |
| 6,109,029 A * | 8/2000 | Vowles et al. | 60/398 |
| 8,267,047 B2 * | 9/2012 | Tunze | 119/247 |
| 2008/0122224 A1* | 5/2008 | Van Berkel | 290/42 |
| 2012/0255112 A1* | 10/2012 | Osterman et al. | 4/491 |
| 2013/0207398 A1* | 8/2013 | Jo | 290/53 |

* cited by examiner

*Primary Examiner* — Michael Zarroli
(74) *Attorney, Agent, or Firm* — Jackson IPG PLLC

(57) ABSTRACT

A wave-driven power generation system that uses a motor reducer to turn a rocker bar in moving wave-making barrels alternatively up and down, causing creation of water waves in a water reservoir so that a float board in the water reservoir is moved by created water waves to rotate transmission mechanisms that are coupled to respective power generators through inertia wheel sets, and thus, the power generators are driven to generate electricity.

5 Claims, 5 Drawing Sheets

WAVE-DRIVEN POWER GENERATION SYSTEM

CROSS-REFERENCE TO RELATED ART

This Invention is a continuation-in-part of U.S. Ser. No. 13/760,162, entitled "Wave-Making and Power Generating System" filed on Feb. 6, 2013 and currently pending.

BACKGROUND OF THE INVENTION

1. Field of the Invention

The present invention relates to power generation technology, and more particularly to a wave-driven power generation system, which moves wave-making barrels in water reservoirs alternatively up and down to create water waves, forcing float boards to move a transmission gearbox in transferring rotary driving force through an inertial wheel set to a power generating unit for generating electricity.

2. Description of the Related Art

Although nuclear power is an effective source of power, the problems of nuclear waste disposal and nuclear power safety have always been controversial. At present, thermal power can provide livelihood electricity, however it is not in line with the principles of environmental protection and its cost is also high. Further, wind-driven and solar power generators are environmentally friendly; however, their cost is high. Further, wind-driven and solar power generators are subject to weather restrictions. Further, hydroelectricity is the production of electrical power through the use of the gravitational force of falling or flowing water, however, the level of gravitational force of falling or flowing water affects the performance of hydroelectric power generation. Further, hydroelectric power plants must be built near dams and water sources, so they are likely to be small and geographically limited.

Therefore, it is desirable to provide a power generation system that is free from geographical limitations, cost-effective and environmentally friendly, and that does not cause pollutions or produce waste materials.

SUMMARY OF THE INVENTION

The present invention has been accomplished under the circumstances in view. It is the main object of the present invention to provide a wave-driven power generation system consisting of a rocker bar, two wave-making barrels, a motor reducer, a water reservoir, a float board, second and third links, first and second rocker arms, and two transmission mechanisms, wherein the wave-making barrels that are respectively pivotally connected to the two opposite ends of the rocker bar have a respective beveled bottom face; the double beveled protruding block of the water reservoir defines two reversed bevel surfaces that respectively face toward the beveled bottom faces of the wave-making barrels in a parallel relationship; the float board is pivotally supported on the rod member in the water reservoir and has two beveled lateral faces respectively located at two opposite lateral sides thereof and respectively sloping in direction reversed to the sloping directions of the beveled bottom faces of the wave-making barrels; thus, the wave-making barrels can effectively create water waves in the water reservoir to move the float board and the transmission mechanisms and to further drive the power generators to generate electrical power supply efficiently.

It is another object of the present invention to provide a wave-driven power generation system, which consumes simply a small amount of electricity to drive wave-making barrels in creating water waves for moving power generators to generate electrical power supply efficiently.

It is still another object of the present invention to provide a wave-driven power generation system, which is free from geometrical limitations, less expensive for a wide range of applications and in line with the principles of environmental protection, and, which does not cause pollution or produce waste materials and allows repeated use of the supplied water.

DETAILED DESCRIPTION OF THE INVENTION

Figure 1:
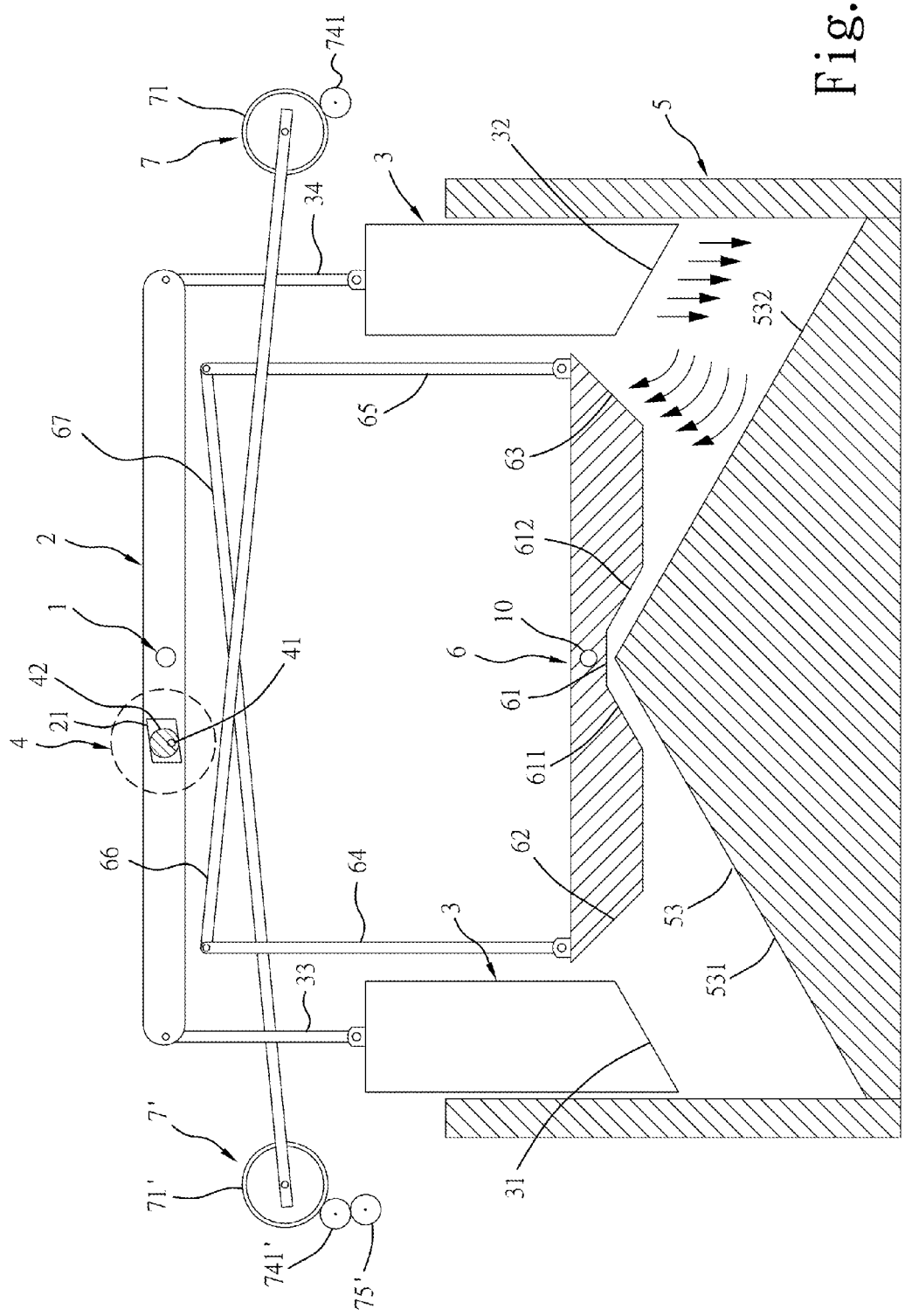
FIG. 1 is a schematic sectional side view of a wave-driven power generation system in accordance with the present invention.
Figure 2:
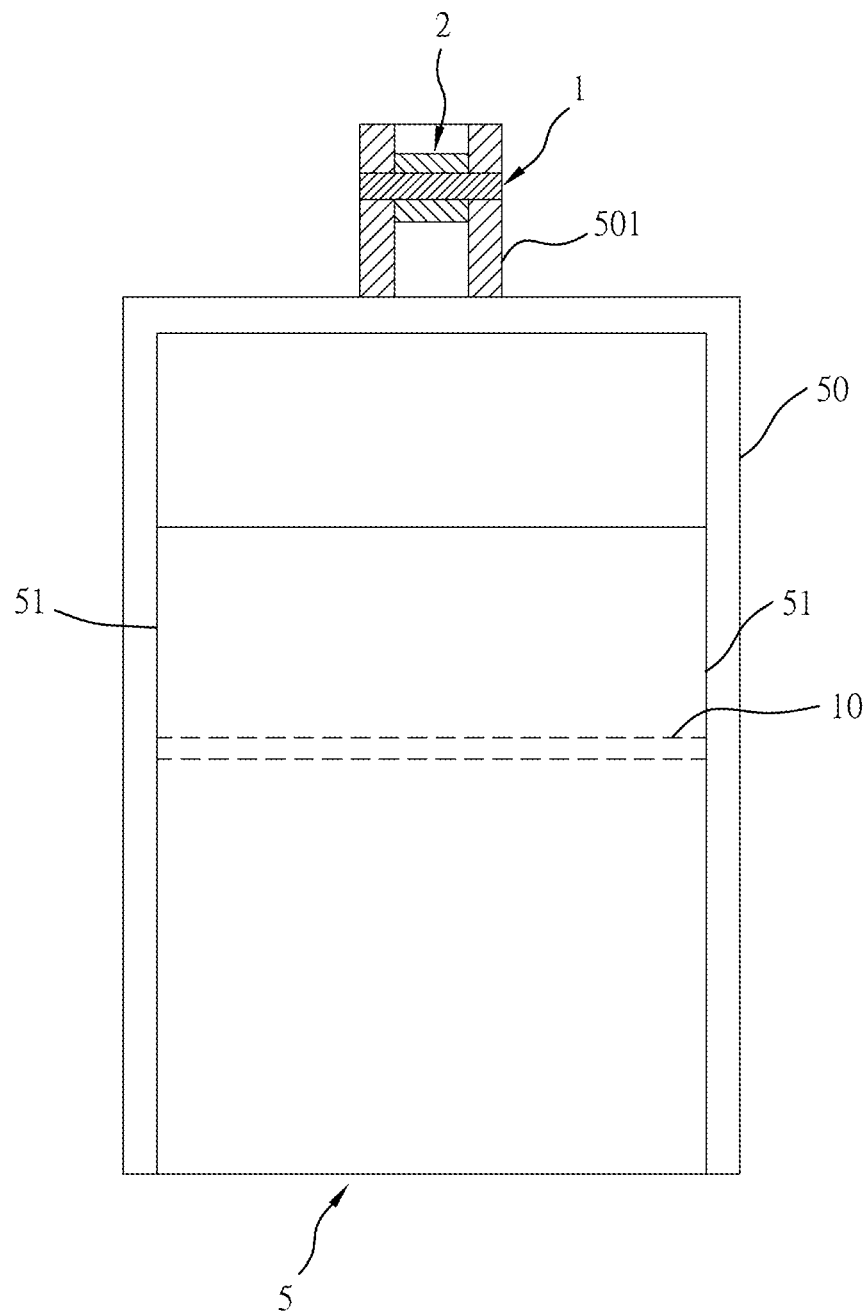
FIG. 2 is a schematic sectional view of a part of the wave-driven power generation system in accordance with the present invention.
Figure 3:
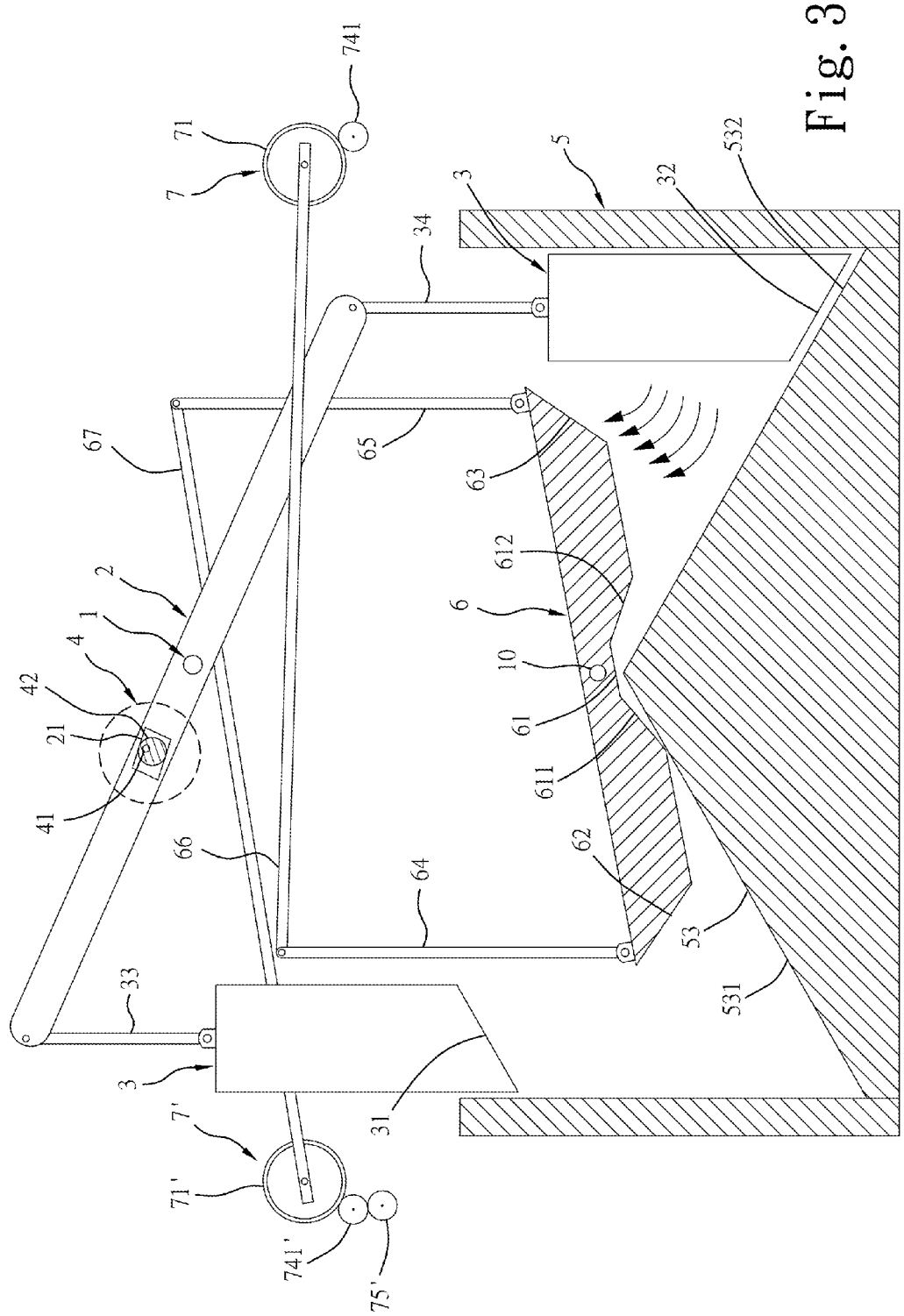
FIG. 3 is a schematic applied view of the present invention, illustrating an operation status of the wave-driven power generation system.
Figure 4:
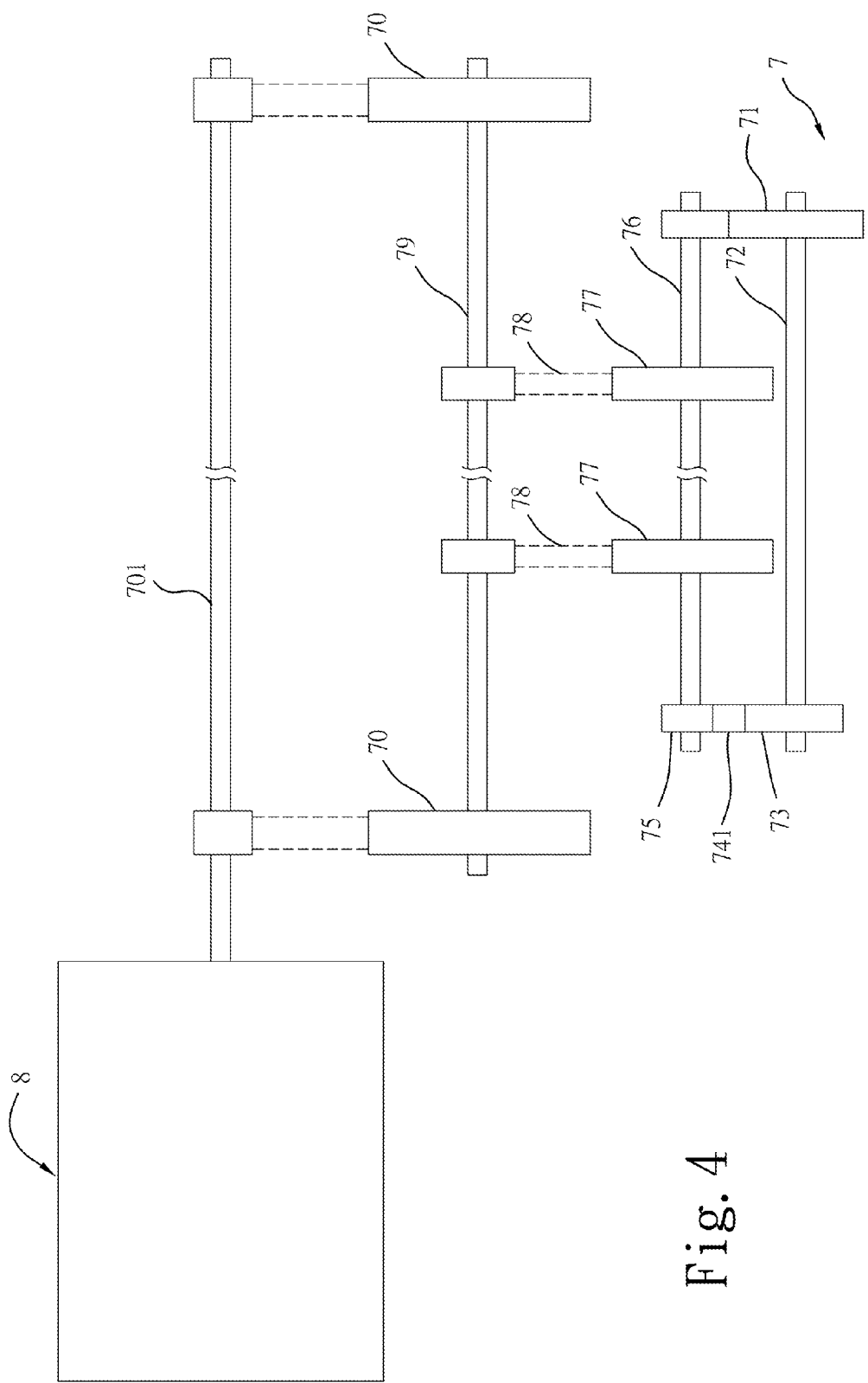
FIG. 4 is a schematic plain view illustrating the arrangement of one transmission mechanism with one respective power generator of the wave-driven power generation system in accordance with the present invention.
Figure 5:
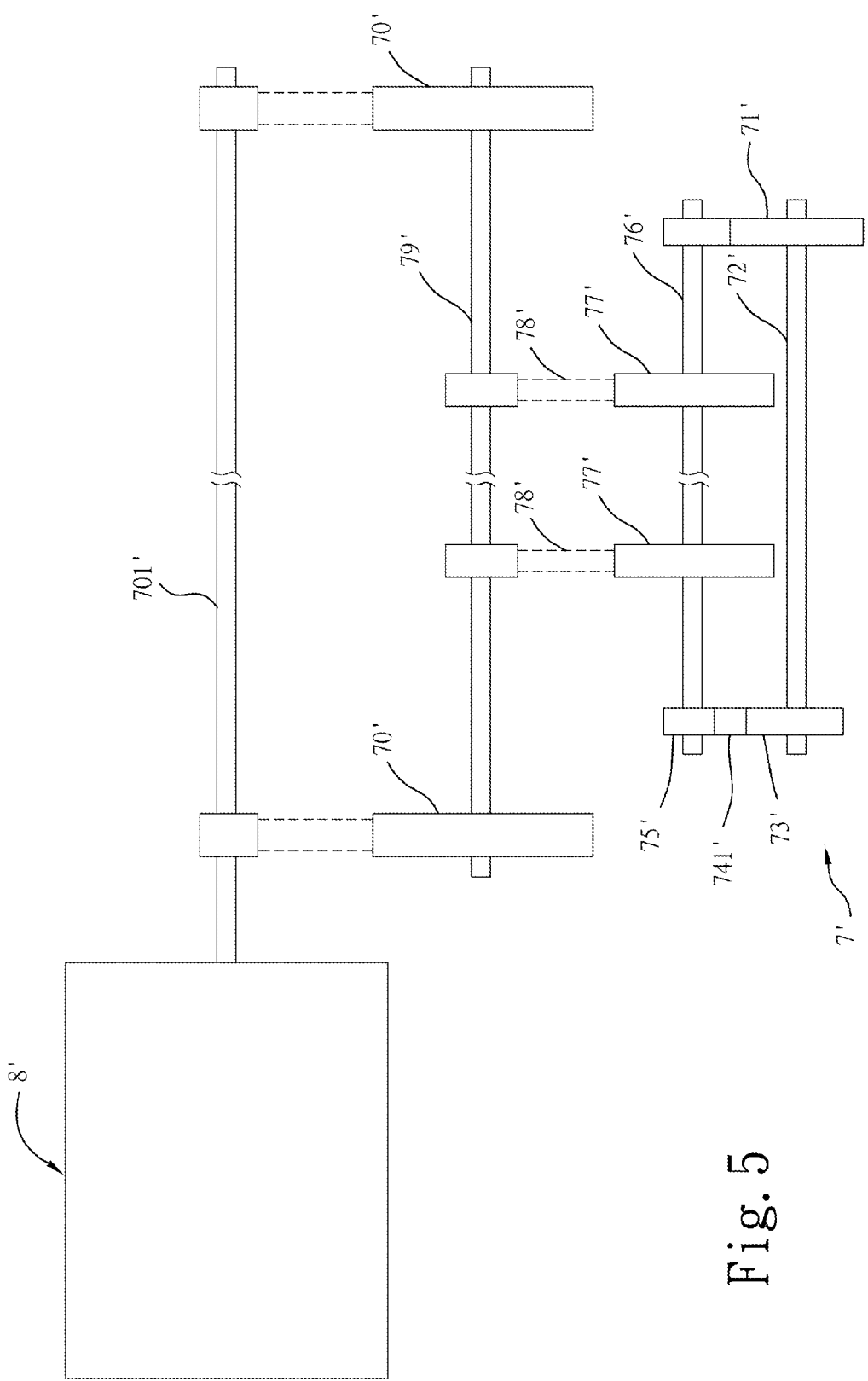
FIG. 5 is a schematic plain view illustrating the arrangement of the other transmission mechanism with the associating power generator of the wave-driven power generation system in accordance with the present invention.

Referring to FIGS. 1-5, a wave-driven power generation system in accordance with the present invention is shown. The wave-driven power generation system comprises:

a rocker bar 2 having a pivot member 1 located on the middle thereof and pivotally connected to a water reservoir 5 in a balanced manner, two opposite ends thereof respectively pivotally coupled with a respective wave-making barrel 3 and coupling means, for example, a coupling groove 21 located at one side relative to the pivot member 1 and coupled to a motor reducer 4;

two wave-making barrels 3 each having a respective first link 33 or 34 pivotally provided at a top side thereof and respectively pivotally connected to two opposite ends of the rocker bar 2 and alternatively movable up and down with the rocker bar 2 to oscillate water in the water reservoir 5, and a respective beveled bottom face 31 or 32 sloping in a reversed direction relative to each other;

a motor reducer 4 comprising an output shaft 41 for power output and an eccentric wheel 42 mounted at the distal end of the output shaft 41 and coupled to the coupling groove 21 of the rocker bar 2 and rotatable to move the rocker bar 2 alternatively up and down;

a water reservoir 5 comprising a support frame 50 affixed to two opposite upright walls 51 thereof (see FIG. 2), a pivot support 501 located at a middle part of a top side of the support frame 50 to pivotally support the pivot member 1 of the rocker bar 2 (see FIG. 2), a rod member 10 transversely connected between the two opposite upright walls 51 at a suitable elevation (see FIG. 2) for pivotally supporting a float board 6 (see FIG. 1), and a double beveled protruding block 53 raised from a top surface of a bottom wall thereof (see FIG. 1) and defining two reversed bevel surfaces 531 and 532 that respectively face toward the beveled bottom face 31 and 32 of the wave-making barrel 3 in a parallel relationship;

a float board 6 that is supported on and movable up and down with the water level in the water reservoir 5 and that comprises a bottom recess 61 located at a bottom side thereof and adapted for receiving an upper part of the double beveled protruding block 53 of the water reservoir 5 when the float board 6 is lowered in the water reservoir 5, two bottom guide surfaces 611 and 612 that are defined in the bottom recess 61 at two opposite lateral sides and respectively kept away from the double beveled protruding block 53 when its upper part is received in the bottom recess 61, and two beveled lateral faces 62 and 63 respectively located at two opposite lateral sides thereof and respectively sloping in direction reversed to the sloping directions of the beveled bottom faces 31 and 32 of the wave-making barrels 3;

a second link 64 and a third link 65 respectively pivotally connected with respective bottom ends thereof to opposing left and right sides of the float board 6;

a first rocker arm 66 and a second rocker arm 67 respectively pivotally connected with respective one ends thereof to respective opposite top ends of the second and third links 64 and 65;

two transmission mechanisms 7 and 7' respectively pivotally connected with respective opposite ends of the first and second rocker arms 66 and 67 (see FIG. 1, FIG. 4 and FIG. 5); and a plurality of power generators 8 and 8' drivable by the transmission mechanisms 7 and 7' to generate electrical power supply.

Further, the transmission mechanisms 7 and 7' each comprise a first transmission gearwheel 71 or 71' respectively pivotally connected with the respective opposite ends of the first and second rocker arms 66 and 67 (see FIG. 1, FIG. 4 and FIG. 5), a second transmission gearwheel 73 or 73', a first transmission shaft 72 connected between the first transmission gearwheel 71 or 71' and the second transmission gearwheel 73 or 73', a small idle gear 741 or 741' meshed with the second transmission gearwheel 73 or 73', a second small gear 75 or 75' meshed with the small idle gear 741 or 741', a second transmission shaft 76 or 76' rotatable with the second small gear 75 or 75', a plurality of sprocket wheels or belt pulleys 77 or 77' mounted on and rotatable with the second transmission shaft 76 or 76', a third transmission shaft 79 or 79' disposed in parallel to the second transmission shaft 76 or 76', a plurality of chains or belts 78 or 78' respectively coupled between the sprocket wheels or belt pulleys 77 or 77' and the third transmission shaft 79 or 79', a fourth transmission shaft 701 or 701' coupled with the respectively power generators 8 or 8', and a plurality of inertia wheel sets 70 and 70' respectively coupled between the third transmission shaft 79 or 79' and the fourth transmission shaft 701 or 701'.

Thus, when the motor reducer 4 is started to rotate the output shaft 41, the eccentric wheel 42 is rotated to bias the rocker bar 2 on the pivot member 1, moving the first links 33 and 34 and the wave-making barrels 3 alternatively up and down to create water waves in the water reservoirs 5. At this time, the float board 6 is turned about the rod member 10 alternatively up and down to move the transmission mechanisms 7 and 7' via the second and third links 64 and 65 and the first and second rocker arm 66 and 67, and thus the inertia wheel sets 70 and 70' of the transmission mechanisms 7 and 7' are rotated to move the power generators 8 and 8', driving them to generate electrical power supply.

Further, the float board 6 is selected from the material group of metal, cement, metal reinforced cement and cement mixture.

Further, the water reservoir 5 can be made of high-strength metal, high-strength plastics, cement, cement mixture, or any other high-strength material, in the form of a top-open water container.

In conclusion, the invention provides a wave-driven power generation system that has advantages and features as follows:

1. The wave-making barrels 3 that are respectively pivotally connected to the two opposite ends of the rocker bar 2 have a respective beveled bottom face 31 or 32; the double beveled protruding block 53 of the water reservoir 5 defines two reversed bevel surfaces 531 and 532 that respectively face toward the beveled bottom face 31 and 32 of the wave-making barrel 3 in a parallel relationship; the float board 6 is pivotally supported on the rod member 10 in the water reservoir 5 and has two beveled lateral faces 62 and 63 respectively located at two opposite lateral sides thereof and respectively sloping in direction reversed to the sloping directions of the beveled bottom faces 31 and 32 of the wave-making barrels 3; thus, the wave-making barrels 3 can effectively create water waves in the water reservoir 5 to move the float board 6 and the transmission mechanisms 7 and 7' and to further drive the power generators 8 and 8' to generate electrical power supply efficiently.

2. The wave-driven power generation system consumes simply a small amount of electricity to drive wave-making barrels in creating water waves for moving the power generators to generate electrical power supply efficiently.

3. The wave-driven power generation system is free from geometrical limitations, less expensive for a wide range of applications and in line with the principles of environmental protection, and, which does not cause pollution or produce waste materials and allows repeated use of the supplied water.

What is claimed is:

1. A wave-driven power generation system, comprising:
a rocker bar having a pivot member located on a middle part thereof and pivotally connected to a water reservoir in a balanced manner, two opposite ends thereof respectively pivotally coupled with a respective wave-making barrel and coupling means located at one side relative to said pivot member and coupled to a motor reducer;
two wave-making barrels each having a respective first link pivotally provided at a top side thereof and respectively pivotally connected to two opposite ends of said rocker bar and alternatively movable up and down with said rocker bar to oscillate water in a water reservoir, and a respective beveled bottom face sloping in a reversed direction relative to each other;
a motor reducer comprising an output shaft for power output and an eccentric wheel mounted at a distal end of said output shaft and coupled to said coupling means of said rocker bar and rotatable to move said rocker bar alternatively up and down;
a water reservoir comprising a support frame affixed to two opposite upright walls thereof, a pivot support located at a middle part of a top side of said support frame to pivotally support said pivot member of said rocker bar, a rod member transversely connected between said two opposite upright walls at a predetermined elevation for pivotally supporting a float board, and a double beveled protruding block raised from a top surface of a bottom wall thereof, said double beveled protruding block defining two reversed bevel surfaces that respectively face toward the beveled bottom faces of said wave-making barrels in a parallel relationship;
a float board supported on and movable up and down with the water level in said water reservoir, said float board comprising a bottom recess located at a bottom side thereof and adapted for receiving an upper part of said double beveled protruding block of said water reservoir when said float board is lowered in said water reservoir, two bottom guide surfaces defined in said bottom recess at two opposite lateral sides and respectively kept away from said double beveled protruding block, and two beveled lateral faces respectively located at two opposite lateral sides thereof and respectively sloping in direction reversed to the sloping directions of the beveled bottom faces of said wave-making barrels;

a second link and a third link respectively pivotally connected with respective bottom ends thereof to opposing left and right sides of said float board;

a first rocker arm and a second rocker arm respectively pivotally connected with respective one ends thereof to respective opposite top ends of said second and third links;

two transmission mechanisms respectively pivotally connected with respective opposite ends of said first and second rocker arms; and a plurality of power generators drivable by said transmission mechanisms to generate electrical power supply.

2. The wave-driven power generation system as claimed in claim 1, wherein said transmission mechanisms each comprise a first transmission gearwheel respectively pivotally connected with the respective opposite ends of said first and second rocker arms, a second transmission gearwheel, a first transmission shaft connected between said first transmission gearwheel and the second transmission gearwheel, a small idle gear meshed with said second transmission gearwheel, a second small gear meshed with said small idle gear, a second transmission shaft rotatable with said second small gear, a plurality of sprocket wheels or belt pulleys or mounted on and rotatable with said second transmission shaft, a third transmission shaft disposed in parallel to said second transmission shaft, a plurality of chains or belts respectively coupled between said sprocket wheels or belt pulleys and said third transmission shaft, a fourth transmission shaft respectively coupled with said power generators, and a plurality of inertia wheel sets respectively coupled between said third transmission shaft and said fourth transmission shaft.

3. The wave-driven power generation system as claimed in claim 1, wherein said float board is selected from the material group of metal, cement, metal reinforced cement and cement mixture.

4. The wave-driven power generation system as claimed in claim 1, wherein said water reservoir is made from one of the materials of high-strength metal, high-strength plastics, cement, cement mixture in the form of a top-open water container.

5. The wave-driven power generation system as claimed in claim 1, wherein said coupling means of said rocker bar is a coupling groove.

* * * * *